United States Patent [19]

Palmer

[11] Patent Number: 4,804,451

[45] Date of Patent: Feb. 14, 1989

[54] DEPLETION COMPARTMENT FOR DEIONIZATION APPARATUS AND METHOD

[75] Inventor: Keith A. Palmer, Lexington, Mass.

[73] Assignee: Millipore Corporation, Bedford, Mass.

[21] Appl. No.: 125,520

[22] Filed: Nov. 25, 1987

Related U.S. Application Data

[63] Continuation of Ser. No. 914,091, Oct. 1, 1986, abandoned.

[51] Int. Cl.$^4$ ............................................. B01D 13/02
[52] U.S. Cl. .................. 204/301; 204/182.4; 204/182.5
[58] Field of Search .................. 204/301, 182.3, 182.4, 204/182.5, 182.6

[56] References Cited

U.S. PATENT DOCUMENTS

| | | | |
|---|---|---|---|
| 2,867,575 | 1/1959 | De Jong | 204/296 |
| 3,359,194 | 12/1967 | Kollsmar | 204/301 X |
| 3,412,006 | 11/1968 | Alexander et al. | 204/301 |
| 3,488,276 | 1/1970 | Tarsey | 204/301 |
| 4,197,206 | 4/1980 | Karn | 210/323 R |
| 4,217,200 | 8/1980 | Kedem et al. | 204/301 |
| 4,569,747 | 2/1986 | Kedem et al. | 204/301 |
| 4,632,745 | 12/1986 | Giuffrida et al. | 204/182.4 X |

Primary Examiner—John F. Niebling
Assistant Examiner—John S. Starsiak, Jr.
Attorney, Agent, or Firm—Andrew T. Karnakis; Paul J. Cook

[57] ABSTRACT

A depletion compartment for a deionization apparatus is provided. The depletion compartment includes a spacer containing longitudinal ribs that divide an open central section of the spacer into subcompartments, an anion permeable membrane and a cation permeable membrane. Each membrane is formed from an ion permeable resin supported on an ion permeable support. Each membrane is skived at the point of bonding of the membranes of the spacer so that the support portion of the membranes is bonded directly to the spacer.

15 Claims, 5 Drawing Sheets

DEPLETION COMPARTMENT FOR DEIONIZATION APPARATUS AND METHOD

This is a continuation of co-pending application Ser. No. 914,091 filed on Oct. 1, 1986 now abandoned.

BACKGROUND OF THE INVENTION

This invention relates to a novel deionization apparatus adapted to transfer ions in a liquid under the influence of a polar field. More specifically, this invention relates to a deionization apparatus adapted to purify aqueous liquids to effect the production of high purity water and the bonding of membranes in such apparatus.

The purification of a liquid by reducing the concentration of ions or molecules in the liquid has been an area of substantial technological interest. Many techniques have been used to purify and isolate liquids or to obtain concentrated pools of specific ions or molecules from a liquid mixture. The most well known processes include electrodialysis, liquid chromatography, membrane filtration and ion exchange. A lesser known methodology is electrodeionization, occasionally mistermed filled cell electrodialysis. Electrodeionization has been difficult to develop as a commercial process due primarily to the inconsistencies of structural design.

In both electrodialysis and electrodeionization, ion exchange membranes are utilized in the apparatus. These membranes have the characteristic of promoting the transfer of the specific ions therethrough under the influence of a polar field. In use, a liquid having a high concentration of undesired ions is passed through a compartment at least one wall of which comprises an ion exchange membrane and, as the liquid passes through the compartment, ions are removed from the compartment through the membrane into an adjacent compartment. The compartment from which the ions are removed is generally known as the diluting compartment while the compartment into which ions migrate are generally termed the concentrating compartment. In electrodeionization apparatus, the dilution compartment is filled with beads of ion exchange resin which promotes the migration of ions into the concentration compartment. In electrodialysis, no resin beads are utilized and the only material within the dilution compartment is the liquid being purified and membrane support screens.

In present electrodialysis and electrodeionization apparatus a plate and frame design is utilized. In one type of device the ion exchange membranes are placed loosely and unbonded in a stack and are held together under pressure. This is undesirable since leaking occurs into the dilution compartments. In addition, in the electrodeionization apparatus it is extremely difficult to construct large devices wherein the spacers, membranes and electrodes are held together without leakage or loss of the resin beads from the dilution compartments. In a second type of device, the membranes are bonded with adhesive, however the bonds are quite weak as the membrane surfaces are usually wet resulting in poor adhesion of the membranes to the support substrate.

In bonding ion exchange membranes, two major problems are encountered. First, the active membranes either must always be wet to prevent damage or they tend to swell after being wet. It is quite difficult to bond a wet membrane and, if a bond is made while dry a dimensional distortion occurs upon subsequent wetting of the membrane which results in a weakening or failure of the bond. Secondly, the active material of the ion exchange membrane is supported on a substrate but is not chemically or heat bonded to the substrate. The bond depends primarily on a mechanical adhesion. Since the active portion of the membrane is usually mechanically weak, and since the membrane and substrate are often incompatible, the bond between the active membrane and the substrate is weak. This results in a bond whose strength is limited by the adhesion strength of the active portion of the membrane to its substrate. Accordingly, it would be highly desirable to provide a means for bonding the ion exchange membrane within an electrodeionization or electrodialysis apparatus which avoids the problems of the prior art. That is, it would be desirable to provide such a means wherein the bonded surface of the membrane need not be wet prior to bonding and the active membrane is fully swollen prior to bonding. Furthermore, it would be desirable to provide such a bonding means wherein the limit of the strength of the bond is not the limit of adhesion between the active portion of an ion exchange membrane and the membrane substrate upon which the active portion is deposited.

SUMMARY OF THE INVENTION

In accordance with this invention, an electrodialysis or electrodeionization apparatus which is composed of multiple layers including ion exchange membranes is provided wherein the ion exchange membranes are adhesively bonded to an adjacent layer in order to define the dilution compartment portions of the apparatus. Prior to being adhesively bonded to an adjacent layer in the deionization apparatus, the ion exchange membranes are treated to remove the ion exchange portion of the membrane thereby to expose the substrate portion of the ion exchange membrane in those areas which are to be adhesively bonded to the next adjacent layer. The ion exchange polymer on the surface of the ion exchange membrane substrate opposite the surface which has been partially removed remains intact. This results in a composite structure characterized by strong adhesive bonds while retaining its desired ion exchange characteristics. The desired ion exchange characteristics are maintained primarily because one ion exchange surface of the ion exchange membrane remains intact.

DETAILED DESCRIPTION OF SPECIFIC EMBODIMENTS

Figure 1:
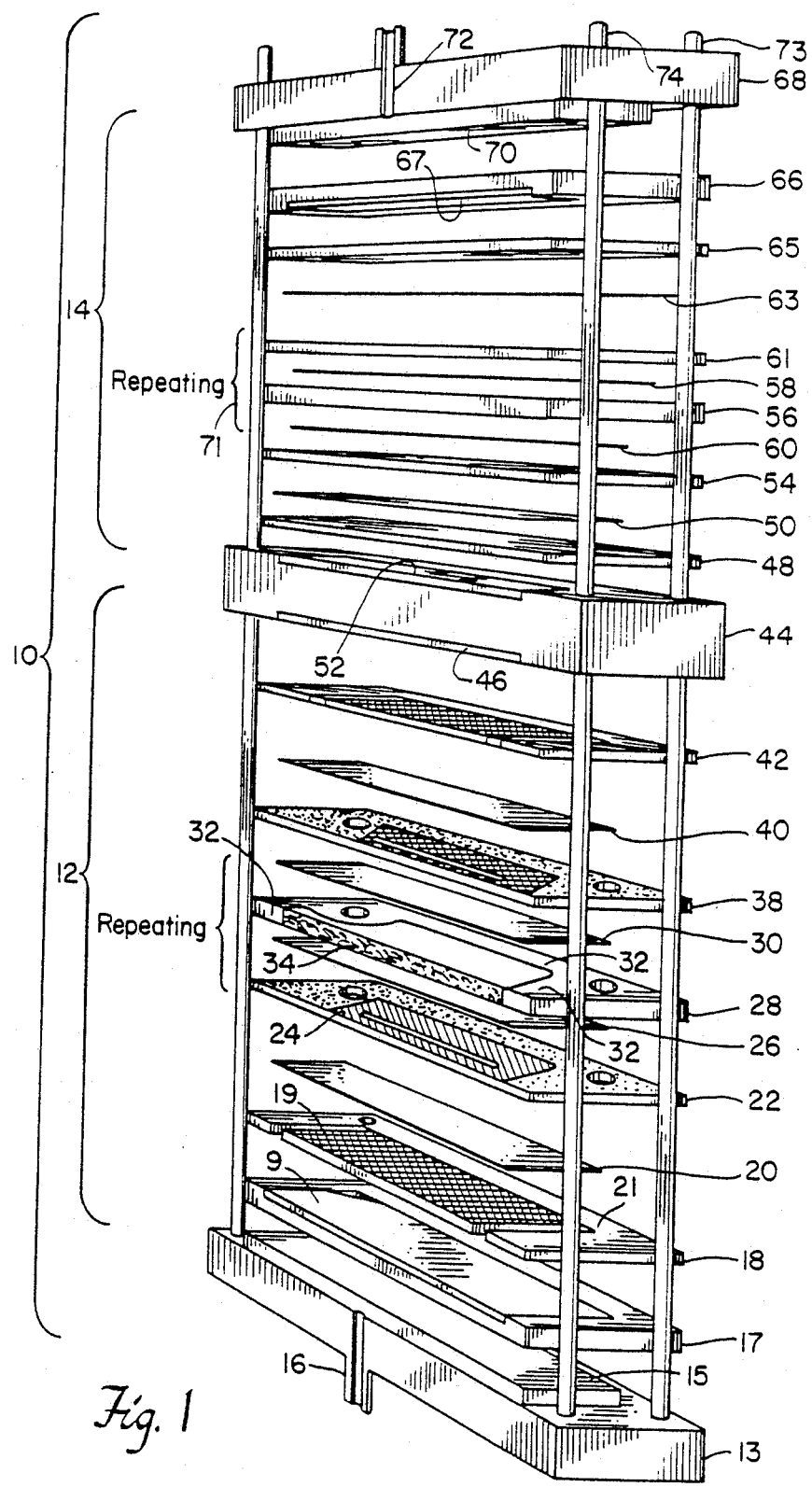
FIG. 1 is an exploded view of the multistage electrodeionization apparatus utilizing the bonding system of this invention.

In accordance with this invention an ion exchange membrane comprising a porous woven or nonwoven substrate coated on both surfaces with an active ion exchange resin is modified to facilitate bonding the membrane to a support with an adhesive. The surface of the membrane is modified by removing a portion of the ion exchange resin from one surface of the substrate to expose the substrate in those areas where it is to be adhered to the support. The exposed areas of the membrane then are adhesively bonded to the support in such a manner as to seal the depletion compartment portions of the deionization apparatus from the concentration compartment portions of the deionization apparatus. The surface of the ion exchange membrane opposite to the adhesively bonded membrane surface remains intact so that the ion exchange properties of the bonded membrane are not adversely affected. The unmodified surface of the ion exchange membrane is maintained tight against the next adjacent element of the deionization apparatus by pressure. Since the ion exchange membranes are adhesively bonded to a spacer to form the depletion compartments, there is no undesirable leakage either into or from the depletion compartments. The liquid being deionized passes through the depletion compartments by means of a liquid inlet and a liquid outlet communicating with the interior of the depletion compartments. In one embodiment of this invention, a unmodified membrane surface can be adhesively bonded to the next adjacent spacer since this bond is not critical to preventing leakage between the concentration compartment and the dilution compartment. This second adhesive bond merely assists in reducing or preventing leakage from inside to the outside of the overall apparatus.

This invention will be described hereinafter with reference to a particular electrodeionization apparatus design. It is to be understood that the depletion compartment construction of this invention is not limited to this particular design but that it can be incorporated into any electrodeionization or electrodialysis apparatus utilizing depletion compartments having an inlet and an outlet and having at least one ion exchange membrane adhesively sealed to a spacer so that an enclosed leakproof depletion compartment is formed.

The depletion compartment of this invention can be utilized in an electrodeionization apparatus wherein each electrodeionization electrical stage includes an anode and a cathode, a series of concentration compartments and a series of depletion compartments that contain an ion exchange material such as a mixture of anion exchange resin and cation exchange resin. The depletion compartments are formed so that the ion exchange resin mixture is housed within independent discrete subcompartments each of which has a width of about four inches or less, preferably between about 0.5 and about 1.5 inches. The discrete subcompartments are formed by adhesive bonding both the anion permeable membrane and the cation permeable membrane to the periphery of the depletion compartment and to ribs which extend across the thickness of and along the entire length of the depletion compartment so that each subcompartment is defined by a pair of ribs, the anion permeable exchange membrane and the cation permeable membrane. In accordance with this invention, the ion exchange resin on the surface of the membranes is delaminated to expose the membrane substrate prior to being adhesively bonded to the periphery of the depletion compartments and the ribs. Control of the thickness and width of the depletion compartments have been found to be desirable when it is desired to improve the efficiency of the electrodeionization apparatus. The solid ion exchange material positioned within the subcompartments are constrained from moving between subcompartments by the ribs and the ion permeable membranes. Representative suitable solid ion exchange material include fibers or beads or the like. When employing ion exchange beads, typical bead diameter is about 0.04 inches or less, preferably between about 0.033 and about 0.012 inches in diameter (20 to 50 mesh).

The electrodeionization apparatus can comprise one or a plurality of stages. In each stage, an anode is positioned at an opposite end of a stack of depleting and concentrating compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentrating compartments constructed as set forth herein. The liquid to be depleted of ions can be passed in parallel through each depleting compartment in each stage and a second liquid can be passed through each concentrating compartment in parallel in each stage in order to effect removal of ions from the first liquid in the depleting compartments into the second liquid in the concentrating compartments. When a plurality of stages are utilized, the liquid removed from the depleting compartments in an upstream stage can be directed in series into the depleting compartments in the next adjacent downstream stage. Similarly, the liquid removed from the concentrating compartments of an upstream stage can be directed in series to the concentrating compartments in the next adjacent downstream stage. Electrolyte can be passed through the spacer adjacent each electrode in the electrodeionization apparatus. The thickness of the depletion subcompartments should be between about 0.25 and about 0.05 inches, preferably between about 0.06 and 0.125 inches. the width of the depletion subcompartments should be between about 0.3 and about 4 inches, preferably between about 0.5 and about 1.5 inches. There is no limit on the length of the depletion subcompartment other than as dictated by practical construction and fluid pressure loss considerations. Obviously, the longer the depletion subcompartment length, the greater the ion removal from the liquid therein. Generally, the length of the subcompartment are between about 5 inches and about 70 inches.

The subcompartments can contain 100% anion exchange material, 100% cation exchange material or a mixture of the two. When it is desired to remove only a particular anion or particular cation, 100% of the appropriate ion exchange material is used. Usually it is desired to remove both cations and anions in order to produce a purified liquid product. When utilizing strong acid-base resin materials such as beads, the ratio of anion exchange resin beads to cation exchange resin beads generally are about 60 to 40 by volume. By utilizing the subcompartment structure in the depletion compartments, efficient mixing of the liquid and the beads therein is attained while avoiding channeling of the liquid through the depletion compartments as well as avoiding compaction or movement of the beads within a portion of the volume of the depletion compartment. Thus, efficient interchange of the ions in the liquid in the depletion compartment with the ions in the beads to effect ion removal from the liquid in the depletion compartment is attained.

This invention will now be described with reference to the accompanying drawings. A multistage electrodeionization apparatus is shown in FIG. 1.

Referring to FIG. 1, the electrodeionization apparatus 10 comprises a first stage 12 and a second stage 14. The first stage 12 includes an end plate 13 having an expandable bladder 15 and an inlet 16 for fluid to expand the bladder 15. Adjacent with endplate 13 is an endblock 17 to house electrode 9 and provide desired manifolding. An electrode spacer 18 is positioned adjacent to the end block 17 and includes a screen 19 which effects non-laminar flow of liquid passing through the electrode spacer 18. An ion permeable membrane 20 is positioned against the periphery 21 of electrode spacer 18. A spacer 22 formed of flexible material includes a screen 24. The spacer 22 and screen 24 comprise the concentrating compartment of the electrodeionization apparatus of this invention. The depletion compartment structure of this invention comprises an ion permeable membrane 26, a spacer formed of rigid material 28 and an ion permeable membrane 30. The ion permeable membranes 26 and 30 are adhesively sealed to the periphery 32 of the spacer 28 on opposite surfaces of the spacer 28. Mixed ion exchange resin beads 34 are housed within a central space which includes ribs (not shown) and are retained therein by the membranes 26 and 30. The unit which comprises spacers 22 and 28 and membranes 26 and 30 are repeated usually between about 5 and about 100 times in order to provide reasonable liquid flow through capacity in stage 12. A spacer 38 formed of flexible material and ion exchange membrane 40 retained against the periphery of spacer 38 forms the end concentrating compartment. An electrode spacer 42 is positioned adjacent the middle block 44 and end electrode 46.

Stage 14 is identical in structure to stage 12 but can have more or fewer cells pairs and includes electrode spacer 48 and membrane 50 retained against the periphery of electrode spacer 48. An electrode 52 is provided in middle block 44. The repeating unit in stage 14 comprises a spacer 54 formed of flexible material as well as a spacer 56 formed of rigid material to which are adhesively bonding membranes 58 and 60. A spacer 61 formed of flexible material then is provided followed by a membrane 63, an electrode spacer 65, and endblock 66 and electrode 67, an end plate 68 and a flexible bladder 70 which is inflated by means of fluid passing through conduit 72. Flow through of liquid in the concentrating and depletion compartments as well as in the electrode compartment will be explained with reference to the remaining figures. The electrodeionization apparatus is retained in place by bolts 73 and 74 as well as by bolts on the opposing end of the apparatus 10 that extend along the entire length of the apparatus 10. The number of repeating units in the second stage 14 is usually between about 5 and about 100, preferably between about 20 and about 60.

By independently varying voltage, electrical current can be controlled in each stage to provide good economy and efficiency for the overall electrodeionization process. Alternatively, a single stage 14 can be utilized as the apparatus of this invention or additional stages can also be utilized. In any event, the flow rate of liquid through the depletion and concentrating compartments and the operating voltage utilized in a particular stage is controlled to maximize efficiency for the overall apparatus in terms of ion removal and electrical power utilized.

Figure 2:
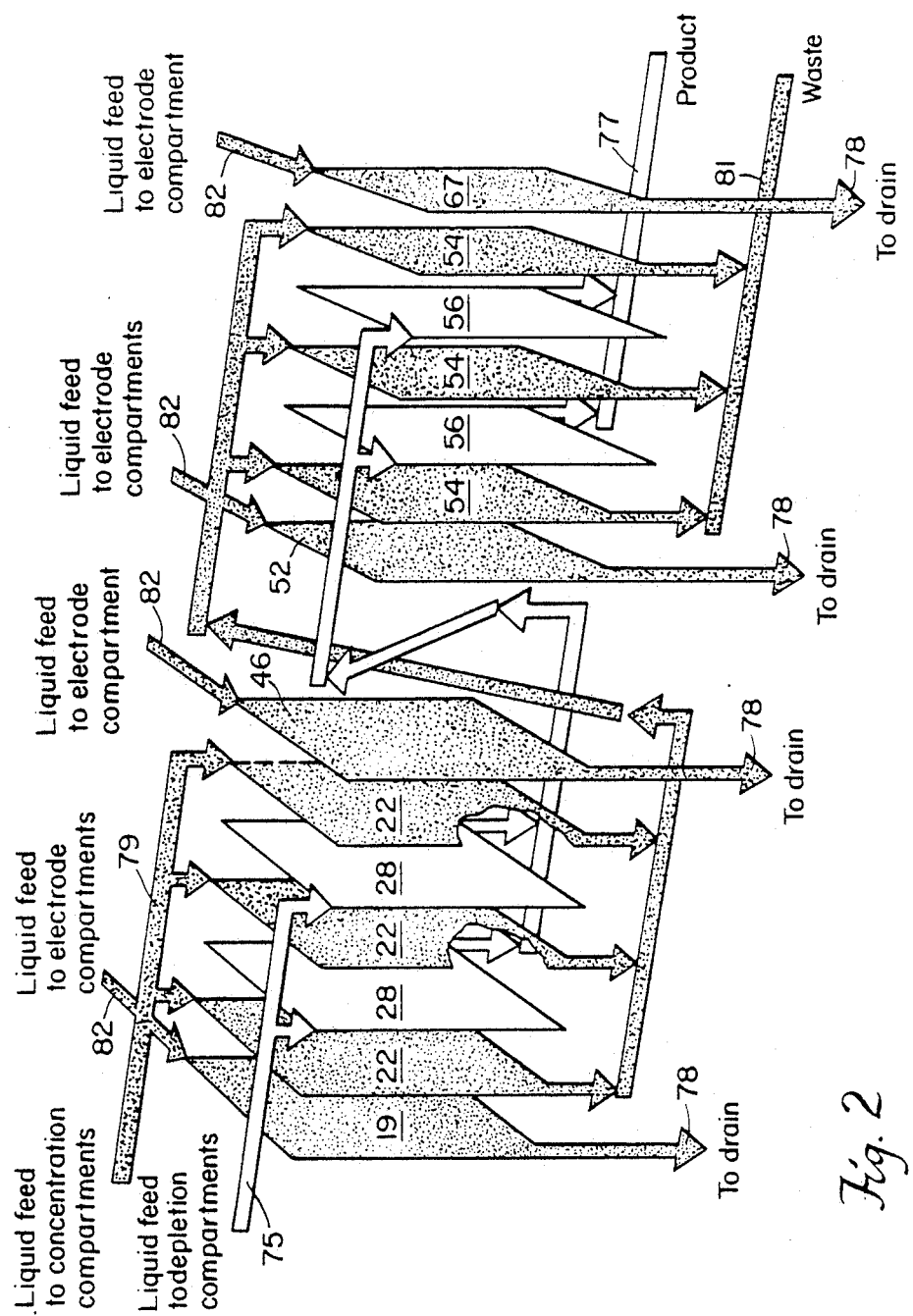
FIG. 2 is a schematic view illustrating the operation of the apparatus of FIG. 1.

Referring to FIG. 2, the flowpaths of the liquids in the various compartments are explained. Liquid to be purified enters inlet 75, passes through depletion compartments 28, is then passed through depletion compartments 56 and is recovered from outlet 77. Concentrating liquid is passed through inlet 79 through concentrating compartments 22 and 54 and thence through outlet 81 to drain. Liquid electrolyte is circulated through electrode compartments 19, 46, 52 and 67 from inlets 82 and is discarded to drain through outlets 78.

Figure 3:
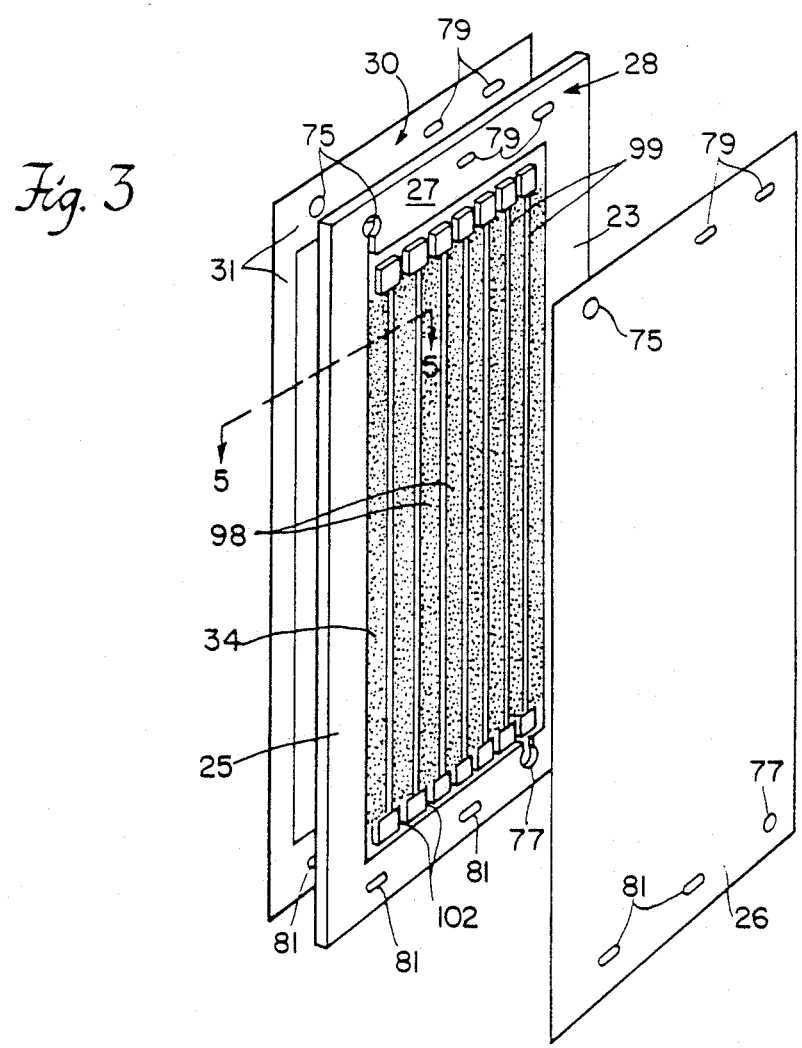
FIG. 3 is a pictorial view showing the depletion chambers of the apparatus of FIG. 1.
Figure 6:
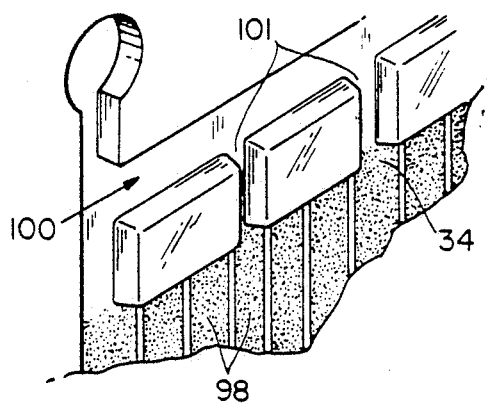
FIG. 6 is a detailed view of the liquid inlet means to the structure of FIG. 3.

Referring to FIG. 3 and 6, the structure of the depletion compartments is shown in detail. The depletion compartment comprises a rigid spacer, e.g. spacer 28, and an anion permeable membrane 30 and cation permeable membrane 26. The ion exchange materials 34 are housed within subcompartments 98 formed by the membranes 26 and 30, the spacer walls 23 and 25 and the ribs 99. The periphery 31 of membrane 30 is skived to remove the ion permeable resin and to expose the membrane support which is adhered directly to spacer 28. The membranes 26 and 30 as well as spacer 28 are provided with inlets 79 and outlets 81 for passage of concentration liquid to and from the concentration compartments. Membranes 26 and 30 as well as spacer 28 also are provided with inlet 75 and outlet 77 for passage of liquid to be deionized through the subcompartments passages 100, subcompartment inlets 101, subcompartments 98 and subcompartment outlets 102. The membranes 26 and 30 are sealed along their entire length to walls 23 and 25 and ribs 99 top spacer section 27 and bottom spacer section 29. The membranes 26 and 30 are also sealed to the individual subcompartment 98 and are isolated from each other. The electrodeionization apparatus is subjected to an electrical voltage in order to pass anions through membrane 30 and cations through membrane 26. The purified liquid then passes through outlets 102 and spacer outlet 77 wherein it is collected in accordance with the explanation of FIG. 2.

Figure 4:
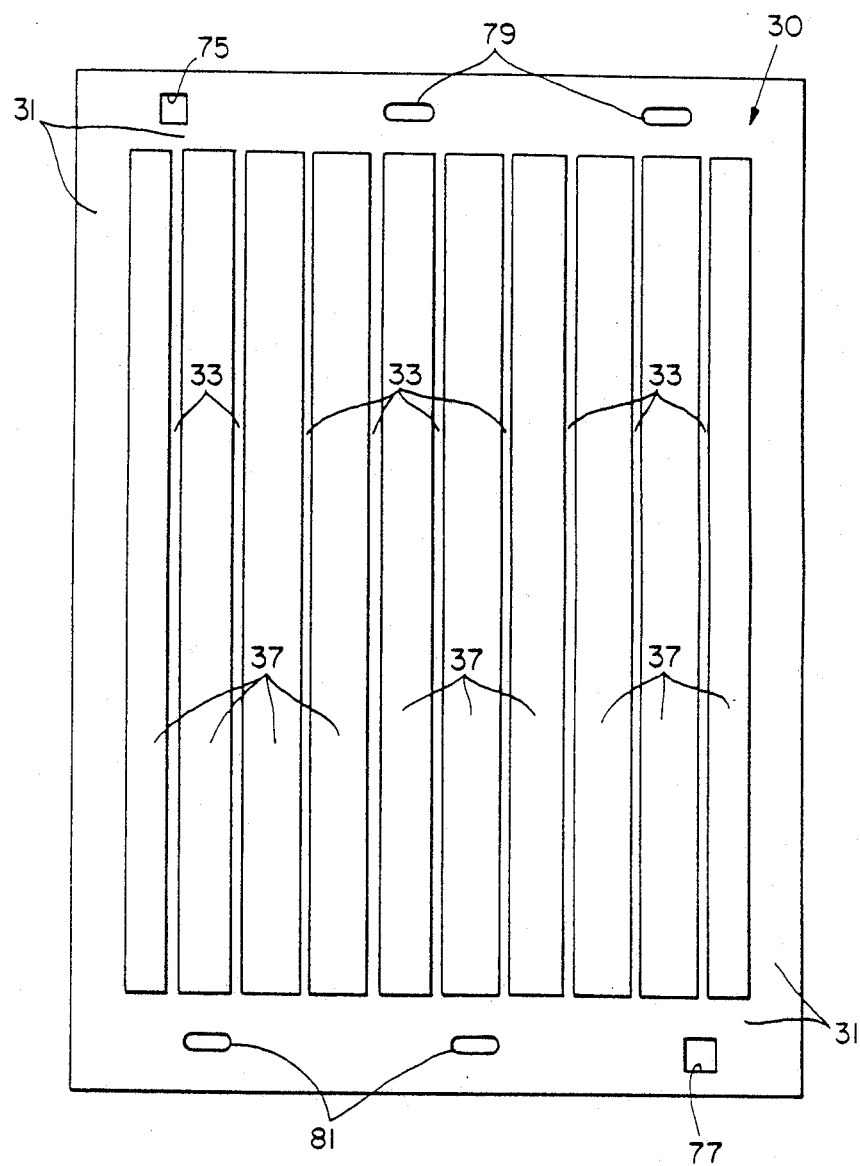
FIG. 4 is a top view of an ion exchange membrane modified in accordance with this invention.

Referring to FIG. 4, one surface of an ion exchange membrane 30 is shown. A peripheral portion 31 of the membrane 30 has the ion exchange resin removed to expose the membrane substrate. In addition, exposed areas 33 which are adhered to ribs 99 and are formed by removing the ion exchange resin composition from the membrane to expose the membrane substrate. The remainder of the ion exchange resin 37 which can contain a binder is retained on the membrane 30. Since the ion exchange resin on the membrane surface opposite that shown in FIG. 4 remains intact (see exposed surface, membrane 26, FIG. 3), some resin removal in areas not to be adhesively bonded does not adversely affect the overall efficiency of the modified membrane.

Figure 5:
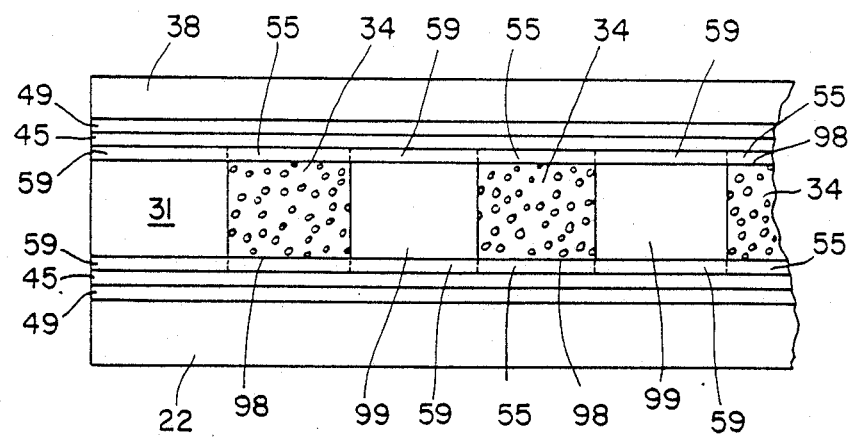
FIG. 5 is a cross-sectional view taken along line 5—5 of FIG. 3 showing the construction of a depletion compartment of this invention.

Referring to FIG. 5, ribs 99 and spacer peripheral section 31 are provided in order to house ion exchange resin beads 43 in subcompartments 98. The ion exchange membranes comprise an intermediate substrate layer 45, an intact ion exchange resin layer 49 and a third layer wherein a portion of the ion exchange resin has been removed and a portion of the ion exchange resin remains 55. An adhesive 59 is applied between the exposed substrate 45 and the ribs 99 and periphery 31. The resultant dilution compartment structure is maintained in a sealed relationship by pressure to adjacent spacers 22 and 38.

It is to be understood that an adhesive composition can be utilized to effect the adhesive bond between the substrate portion of the ion exchange membrane and the adjacent spacer including solvent-based adhesives, hot melt adhesives, direct heat weld, thermoplastic interlays, contact adhesives and pressure sensitive hot melt adhesives.

Any anion permeable membrane to cation permeable membrane having the strength to withstand the operating pressure differential, typically up to about 5 psi, can be utilized in the deionization apparatus. It should be pointed out that sealing of the membranes to the ribs forming the subcompartments permits the use of higher operating pressures and enhances the apparatus of the prior art since the assembly strength is thereby increased. In addition, this sealing assists in maintaining the resin in place, maintains the dimensions of the subcompartments and improves flow through the subcompartments. Representative suitable anion permeable membranes include a homogeneous type web supported styrene - divinylbenzene based with sulfonic acid or quarternary ammonium functional groups sold under the identifications CR61-CZL-386 and AR 103-QZL-386 by Ionics Inc.; a heterogeneous type web supported using styrene - divinylbenzene based resins in a polyvinylidene difluoride binder sold under the identifications MC - 3470 and MA - 3475 by Sybron/Ionac, a homogeneous type web supported styrene - divinylbenzene based with sulfonic acid or quarternary ammonium functional groups sold under the name Neosepta by Tokuyama Soda Co. Ltd.; a homogeneous type web supported styrene - divinylbenzene based with sulfonic acid or quaternary ammonium functional groups sold under the name Aciplex by Asahi Chemical Industry Co. Ltd.

The deionization apparatus can be controlled by measuring product water conductivity from all or any one of the stages and adjusting the process parameters including process voltage, liquid flow velocities, temperatures, pressures, and electrical current accordingly.

The following is a description of two methods for controlling the demineralization of an deionization system. The methods can be used separately or in combination in a single or multi-electrical stage system. The first method senses the resistivity and temperature of the feed water and the appropriate cell pair voltage is applied to demineralize the liquid to the desired fraction salt removal.

The second method senses the product resistivity and temperature that is used to control the voltage of the stage to produce water of the desired quality. This type of voltage control can be used to provide product water of a pre-selected quality.

An example of a two-stage system is as follows: The first stage is operated at a variable voltage based on the feed water quality (about 0.5 to 3.0 volts per cell pair) appropriate to achieve approximately 70-80 percent salt removal by using a predetermined resistivity/temperature/percent salt removal relationship. The automatically applied voltage permits operation below the polarization point, thus assuring efficient operation without scaling. The second stage is operated at a variable voltage based on the product water quality (about 0.5 to 3.0 volts per cell pair), appropriate to provide water of a pre-selected quality. Since the feed water to the second stage is product water from the first, the second stage feed is less prone to scaling. For this reason polarization in the second stage is acceptable, and the voltage can therefore be varied to any degree to provide the required product quality.

The following examples illustrate the present invention and are not intended as limitations of the same.

EXAMPLE 1

This example illustrates the improved bonding obtained by the process of this invention as compared to the bonding strengths between a typical spacer material and an ion permeable membrane which has not been treated in accordance with this invention.

Disc-shaped membranes were adhered to a polypropylene or polyacrylic substrate. Discs of 47 mm diameter were adhered from their outer circumference a distance of 10 mm along the radial length and about their entire circumference. The central portion of each disc remained unadhered to the polypropylene or polyacrylic spacer. A fluid port extending through the thickness of the substrate was provided in order to introduce fluid through the port into the space between the disc and the unadhered surface of the spacer thereby to permit increasing the pressure within the space between the spacer and the disc. By increasing the pressure in the space the burst strength of the adhesive bond between the adhesive and the membrane could be determined. The adhesive utilized by a BF Goodrich 905 Hot Melt Film of 10 mil thickness; this adhesive being a styrene-isoprene block copolymer.

The ion permeable membranes tested were those available from Sybron-Ionac as model number MC-3470 (cation permeable membrane) or MA-3475 (anion permeable membrane) supported on a woven polymer web. After being adhered, the membrane discs were soaked in hydrochloric acid solution having a pH of 2, sodium hydroxide solution having a pH of 12 or ultrapure water (Milli-Q). The results are set forth in Table 1. In Table 1, the term "Skived" shows that the sample was skived to remove ion permeable resin.

TABLE I

| Sample | Skived or Surface | Spacer Polymer | Cation or Anion | PH | Time (Days) Soaked | (psi) Burst | Comments |
|---|---|---|---|---|---|---|---|
| 1 | Skived | PP | A | 2 | 13 | 30 | Integral, good adhesion both |
| 2 | Skived | PP | C | 2 | 13 | 20 | Leak at 20 psi, 905 stretches |
| 3 | Surface | PP | C | 2 | 17 | 7 | Integral, release from membrane |
| 4 | Surface | PP | C | 2 | 17 | 4 | Integral, release from membrane |
| 5 | Skived | Acrylic | C | 2 | 17 | 30 | Integral, release from membrane |
| 6 | Skived | PP | C | Control | Dry | 40 | Integral, release from membrane |
| 7 | Skived | PP | A | 12 | 13 | 30 | Adhesive good to membrane & PP |
| 8 | Skived | PP | C | 12 | 13 | 8 | Adhesive good to membrane & PP |
| 9 | Surface | Acrylic | A | 12 | 13 | 2 | Adhesive fail to acrylic poor membrane. |
| 10 | Skived | PP | C | Milli-Q | 13 | 0 | Leaked initially, no press |
| 11 | Surface | PP | A | Milli-Q | 13 | 0 | Membrane fell off in soak |

TABLE I-continued

| Sample | Skived or Surface | Spacer Polymer | Cation or Anion | PH | Time (Days) Soaked | (psi) Burst | Comments |
|---|---|---|---|---|---|---|---|
| 12 | Skived | PP | A | Milli-Q | 13 | 5 | Integral |

"Surface" indicates that the ion permeable membrane surface was not treated—i.e. no exposed substrate. Under the heading "Spacer Polymer", the term "PP" indicates polypropylene and acrylic indicates a polyacrylic spacer.

As shown in Table I, the bond between the skived membrane and the adhesive was much higher than the untreated samples. In sample number 10, a leakage occurred due to poor technique in initially adhering the skived membrane to the adhesive. In all cases, the adherence of the skived membrane to the adhesive was far superior to the adherent strengths between the untreated ion permeable membrane and the spacer.

Example II illustrates that satisfactory creep strengths can be obtained by forming an adhered product in accordance with this invention. In this example, samples were subjected to a constant load over a long time. In order to determine the extent of creep and the point of failure, if any of the sample. Samples were produced whereby a strip of ion permeable membrane skived on a portion of its surface was bonded to a polypropylene spacer. The skived membrane was bonded to the upper section of the polypropylene spacer on both surfaces of the spacer and a loop was formed by the strip above the polypropylene spacer so that a steel holder could be inserted therein. The bottom portion of the polypropylene spacer included a hole to which a weight of five, ten or fifteen pounds could be attached. These loads caused an elongation of the membrane adhesive complex and the elongation was measured over a time period and recorded as the creep value. The membrane utilized was the anion permeable membrane described in sample 1 of Example 1 and the adhesive utilized was the adhesive described in Example 1. The results are set forth in Table 2.

TABLE 2

| | TIME HRS | MEMBRANE CREEP, M INCHES | ADHESIVE CREEP, A INCHES |
|---|---|---|---|
| FIVE (5) POUND LOAD | 0 | 0 | 0 |
| | 0.5 | 0.01563 | 0.01563 |
| | 1.5 | 0.01563 | 0.03125 |
| | 48.0 | 0.01563 | 0.03125 |
| | 191.0 | (NO CHANGE OVER THIS PERIOD) | |
| TEN (10) POUND LOAD | 0 | 0 | 0 |
| | 0.5 | 0.01563 | 0.01563 |
| | 1.0 | 0.01563 | 0.01563 |
| | 24.0 | 0.03125 | 0.0625 |
| | 48.0 | 0.15 | 0.15 |
| | (ADHESIVE RELEASED BETWEEN 37–48 HRS) | | |
| FIFTEEN (15) POUND LOAD | 0 | 0.03135 | 0.03125 |
| | 0.08 | 0.0625 | 0.0626 |
| | 1.0 | 0.0625 | 0.07813 |
| | 4.5 | 0.0625 | 0.07813 |
| | 6.0 | 0.0625 | 0.07813 |
| | 8.0 | 0.0625 | 0.07813 |
| | (ADHESIVE RELEASED AFTER 8 HRS) | | |

In Table 2, "creep,M" is the creep of the membrane while the term "creep,A" is the creep of the adhesive.

The adhesive film exhibited some creep phenomenon. The greater the load on the sample, the greater the elongation and the quicker the failure (break) occurred. The sample subjected to the five pound load did not fail over the life of the test (ten days). Most of the elongation occurs in the first fifteen minutes of the test and then levels off to a relatively constant value for the rest of the test. All of the failures occurred in the middle of the night, consequently times of failure are approximate. With the ten pound load, failure occurred between 37 and 48 hours. With the fifteen pound load, failure occurred at approximately eight hours.

It was determined that the force the adhesive sample was subjected to in the 5 pound creep test was satisfactory for operation in the deionization apparatus, and therefore the samples produced by the process of this invention have satisfactory creep properties.

I claim:

1. In a deionization apparatus adapted to remove ions from a liquid having a cathode compartment at a first end of said apparatus, an anode compartment at an end of said apparatus opposite said first end, a plurality of alternating ion depletion compartments and ion concentration compartments positioned between said anode compartments, each of said ion depletion compartments having a thickness defined by an anion permeable membrane and a cation permeable membrane, each of said membranes comprising a substrate coated by mechanical adhesion on both surfaces of said substrate with an anion permeable resin or a cation permeable resin, means for passing a first liquid to be purified through said ion depletion compartments, means for passing a second liquid for accepting ions from said first liquid, through said concentration compartments, means for applying an electrical voltage between an anode in said anode compartment and a cathode in said cathode compartment and means for recovering purified liquid from said depletion compartment, the improvement which comprises said ion depletion compartments having a spacer element having a first surface adhered directly to the substrate of the anion permeable membrane and a second surface adhered directly to the substrate of the cation permeable membrane thereby to seal a space between said membranes to prevent liquid in said concentration compartments from entering said dilution compartments, said anion permeable membrane being coated over an entire first anion surface with said anion permeable resin and being partially coated with waid anion permeable resin over a second anion surface to leave said substrate partially exposed on said second anion surface thereby to permit direct adherence of the substrate in said anion permeable membrane to said spacer element, said cation permeable membrane being coated over an entire first cation surface with said cation permeable resin and being partially coated with said cation permeable resin over a second cation surface to leave said substrate partially exposed on said second cation surface thereby to permit direct adherence of the substrate in said cation permeable membrane to said spacer element.

2. In a deionization apparatus adapted to remove ions from a liquid having a cathode compartment at a first end of said apparatus, an anode compartment at an end of said apparatus opposite said first end, a plurality of alternating ion depletion compartments and ion concentration compartments positioned between said cathode and said anode compartments, each of said ion depletion compartments having a thickness defined by an anion permeable membrane and a cation permeable membrane, each of said membranes comprising a substrate coated by mechanical adhesion on both surfaces of said substrate with an anion permeable resin or a cation permeable resin, means for passing a first liquid to be purified through said ion depletion compartments, means for passing a second liquid for accepting ions from said first liquid, through said concentration compartments, means for applying an electrical voltage between an anode in said anode compartment and a cathode in said cathode compartment and means for recovering purified liquid from said depletion compartment, each of said ion depletion compartments comprising a plurality of subcompartments containing an ion exchange solid composition formed by ribs extending the length of said subcomponents, wherein each of said subcompartments has a width between about 0.3 and 4 inches and a thickness defined by the distance between said anion permeable membrane and said cation permeable membrane is between about 0.05 and 0.25 inches, the improvement which comprises said ion depletion compartments having a spacer element having a first surface adhered to directly to the substrate of the anion permeable membrane and a second surface adhered directly to the substrate of the cation permeable membrane thereby to seal subcompartment spaces between said membranes to prevent liquid in said concentration compartments from entering said dilution compartments, said anion permeable membrane being coated over an entire first anion surface with said anion permeable resin and being partially coated with said anion permeable resin over a second anion surface to leave said substrate partially exposed on said second anion surface thereby to permit direct adherence of the substrate in said anion permeable membrane to said spacer element, said cation permeable membrane being coated over an entire first cation surface with said cation permeable resin and being partially coated with said cation permeable resin over a second cation surface to leave said substrate partially exposed on said second cation surface thereby to permit direct adherence of the substrate in said cation permeable membrane to said spacer element.

3. The apparatus of any one of claims 1 or 2 wherein said substrate of the membranes is adhered with a solvent-based adhesive.

4. The apparatus of any one of claims 1 or 2 wherein the substrate of said membranes is adhered to said spacer with a hot melt adhesive.

5. The apparatus of any one of claims 1 or 2 wherein said substrate of the membranes is adhered to said spacer with a direct heat weld.

6. The apparatus of any one of claims 1 or 2 wherein said substrate of the membranes is adhered to said spacer with thermoplastic interlayers.

7. The apparatus of any one of claims 1 or 2 wherein said substrate of the membranes is adhered to said spacer with a contact adhesive.

8. The apparatus of any one of claims 1 or 2 wherein said substrate of the membranes is adhered to said spacer with pressure sensitive hot melt adhesive.

9. In a deionization apparatus adapted to remove ions from a liquid which comprises a plurality of stages, each stage comprising:

a cathode compartment at a first end of said apparatus, an anode compartment at an end of said apparatus opposite said first end, a plurality of alternating ion depletion compartments and ion concentration compartments positioned between said cathode compartment and said anode compartment to define a first stage, each of said ion depletion compartments having a thickness defined by an anion permeable membrane and a cation permeable membrane, each of said membranes comprising a substrate coated by mechanical adhesion on both surfaces of said substrate with an anion permeable membrane on a cation permeable membrane, each of said concentrating compartments being free of ion exchange resin solid composition, means for passing a first liquid to be purified through said ion depletion compartments, means for passing a second liquid for accepting ions from said first liquid, through said concentration compartments, means for applying an electrical voltage between an anode in said anode compartment and a cathode in said cathode compartment, means for transferring purified liquid from the depletion compartments of the first stage to a next adjacent downstream stage, means for transferring said second liquid from the concentration compartments of the first stage to an adjacent downstream stage, and means for recovering purified liquid from the ion depletion compartments in a final downstream stage, the improvement which comprises said ion depletion compartments having a spacer element having a first surface adhered directly to the substrate of the anion permeable membrane and a second surface adhered directly to the substrate of the cation permeable membrane thereby to seal a space between said membranes to prevent liquid in said concentration compartments from entering said dilution compartments, said anion permeable membrane being coated over an entire first anion surface with said anion permeable resin and being partially coated with said nion permeable resin over a second anion surface to leave said substrate partially exposed on said second anion surface thereby to permit direct adherence of the substrate in said anion permeable membrane to said spacer element.

10. The apparatus of claim 9 wherein said membranes are adhered to said spacer with a solvent-based adhesive.

11. The apparatus of claim 9 wherein said membranes are adhered to said spacer with a hot melt adhesive.

12. The apparatus of any one of claim 9 wherein said substrate of the membranes is adhered to said spacer with a direct heat weld.

13. The apparatus of any one of claims 9 wherein said substrate of membranes is adhered to said spacer with thermoplastic interlays.

14. The apparatus of any one of claims 9 wherein said substrate of the membranes is adhered to said spacer with a contact adhesive.

15. The apparatus of any one of claims 9 wherein said substrate of the membranes is adhered to said spacer with a pressure sensitive hot melt adhesive.

* * * * *